US012434909B2

(12) United States Patent
Austrheim et al.

(10) Patent No.: US 12,434,909 B2
(45) Date of Patent: Oct. 7, 2025

(54) REMOTELY OPERATED VEHICLE WITH AN ARRANGEMENT TO PROVIDE A PRE-ALERT AND TRACKING OF A POSITION OF THE VEHICLE

(71) Applicant: Autostore Technology AS, Nedre Vats (NO)

(72) Inventors: Trond Austrheim, Etne (NO); Øystein Gjerdevik, Skjold (NO)

(73) Assignee: AutoStore Technology AS, Nedre Vats (NO)

( * ) Notice: Subject to any disclaimer, the term of this patent is extended or adjusted under 35 U.S.C. 154(b) by 172 days.

(21) Appl. No.: 17/757,412

(22) PCT Filed: Dec. 15, 2020

(86) PCT No.: PCT/EP2020/086254
§ 371 (c)(1),
(2) Date: Jun. 15, 2022

(87) PCT Pub. No.: WO2021/122619
PCT Pub. Date: Jun. 24, 2021

(65) Prior Publication Data
US 2023/0024692 A1 Jan. 26, 2023

(30) Foreign Application Priority Data
Dec. 20, 2019 (NO) .................................. 20191506

(51) Int. Cl.
*B65G 1/04* (2006.01)
*B65G 1/137* (2006.01)
(Continued)

(52) U.S. Cl.
CPC ......... *B65G 1/0464* (2013.01); *B65G 1/0478* (2013.01); *B65G 1/1373* (2013.01);
(Continued)

(58) Field of Classification Search
None
See application file for complete search history.

(56) References Cited

U.S. PATENT DOCUMENTS

| 2016/0229630 | A1  | 8/2016 | Gebhardt et al. |
| 2018/0244467 | A1* | 8/2018 | Hognaland ........... B65G 1/0478 |

(Continued)

FOREIGN PATENT DOCUMENTS

| CN | 104837747 A | 8/2015 |
| CN | 110065750 A | 7/2019 |

(Continued)

OTHER PUBLICATIONS

Search Report issued in Norwegian Application No. 20191506; Dated Jul. 2, 2020 (2 pages).

(Continued)

*Primary Examiner* — Vivek D Koppikar
*Assistant Examiner* — David Ruben Pedersen
(74) *Attorney, Agent, or Firm* — Baker Botts L.L.P.

(57) ABSTRACT

A remotely operated vehicle includes an arrangement to provide a pre-alert and tracking of a position of the vehicle following a travelling route relative to tracks laid out on rails in x-, y-directions on a rail system. The vehicle has first and seconds sets of wheels connected to drives for moving the vehicle in corresponding x-, y-directions on the rail system. The arrangement includes at least one sensor module provided with at least four sensors. A first sensor is directed vertically downwards to detect the rails in the x-direction on the sensor module. A second sensor is directed vertically downwards to detect the rails in the y-direction on the sensor module. A third sensor is positioned on the sensor module to detect a corner of an intersection between the rails in the x-direction and y-direction. A fourth sensor is configured to detect a remaining distance to the arrival of the vehicle at a (Continued)

set position, by detecting the rails in the x direction when travelling in the y direction, and detecting the rail in the y direction when travelling in the x direction. The fourth sensor is placed at a predefined position on the sensor module. A controller is provided on the vehicle to receive the output from at least one of the sensors and to pre-alert the remaining distance of the arrival of the vehicle at the position.

6 Claims, 6 Drawing Sheets

(51) Int. Cl.
    *G05B 19/19*     (2006.01)
    *G05D 1/43*     (2024.01)
    *G05D 109/10*     (2024.01)

(52) U.S. Cl.
    CPC ............... *G05B 19/19* (2013.01); *G05D 1/43* (2024.01); *G05D 2109/14* (2024.01)

(56) References Cited

U.S. PATENT DOCUMENTS

| | | | |
|---|---|---|---|
| 2019/0233213 A1* | 8/2019 | Phan-Quiroga | B65G 1/0492 |
| 2021/0354922 A1* | 11/2021 | Gravelle | B65G 1/0478 |

FOREIGN PATENT DOCUMENTS

| | | |
|---|---|---|
| EP | 3372534 A1 | 9/2018 |
| EP | 3456663 A2 | 3/2019 |
| EP | 3798156 A1 | 3/2021 |
| JP | 2019533858 A | 11/2019 |
| KR | 20160106777 A | 9/2016 |
| WO | 317366 B1 | 10/2004 |
| WO | 2014075937 A1 | 5/2014 |
| WO | 2014090684 A1 | 6/2014 |
| WO | 2015193278 A1 | 12/2015 |
| WO | 2018082972 A1 | 5/2018 |
| WO | 2018146304 A1 | 8/2018 |
| WO | 2019170805 A1 | 9/2019 |
| WO | 2019206440 A1 | 10/2019 |

OTHER PUBLICATIONS

International Search Report issued in International Application No. PCT/EP2020/086254, mailed Mar. 16, 2021 (4 pages).

Written Opinion issued in International Application No. PCT/EP2020/086254; Dated Mar. 16, 2021 (7 pages).

International Preliminary Report on Patentability issued in International Application No. PCT/EP2020/086254; mailed May 2, 2022 (15 pages).

H. Tsukamoto, Official Action for Japanese Patent Application No. 2022-537487, mailed Jun. 18, 2024, 3 pages.

Zhai Liwen, First Office Action for Chinese Patent Application No. 202080088967.3, dated Dec. 31, 2024, 25 pages, pub. by SIPO, Beijing, China.

Etienne, Yves, Extended European Search Report for European patent application No. EP25156493.6, dated Mar. 14, 2025, 9 pages, published by the European Patent Office, Munich, Germany.

Le Huy Anh, Examination Report for Vietnamese Patent Application No. 1-2022-04339, dated Feb. 24, 2025, 4 pages, pub. by The Intellectual Property Office of Vietnam, Hanoi, Vietnam.

Zhai, Liwen, Office Action in CN202080088967.3, mailed Jun. 30, 2025, 15 pages, The State Intellectual Property Office of the People's Republic of China, Beijing, China.

Anonymous, Office Action in KR1020227024496, mailed Jul. 25, 2025, 15 pages, Korean Intellectual Property Office, Daejeon, Korea.

\* cited by examiner

REMOTELY OPERATED VEHICLE WITH AN ARRANGEMENT TO PROVIDE A PRE-ALERT AND TRACKING OF A POSITION OF THE VEHICLE

The present invention relates to an automated storage and retrieval system for storage and retrieval of containers, in particular to a remotely operated vehicle and a method for pre-alert and tracking the position of the vehicle following a travelling route relative to rails laid out on a frame structure in x- and y-direction.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, $Z=1$ identifies the uppermost layer of storage containers, i.e. the layer immediately below the rail system 108, $Z=2$ the second layer below the rail system 108, $Z=3$ the third layer etc. In the exemplary prior art disclosed in FIG. 1, $Z=8$ identifies the lowermost, bottom layer of storage containers. Similarly, $X=1 \ldots n$ and $Y=1 \ldots n$ identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position $X=10$, $Y=2$, $Z=3$. The container handling vehicles 201,301 can be said to travel in layer $Z=0$, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles.

Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105 or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

When a vehicle is moving on the tracks, it is controlled to accelerate from a start position and decelerate to a stop position. The start and stop positions will depend on the route set up for a vehicle prior to picking up a bin from one storage column in the storage grid and placing it in another storage column. A set route of a vehicle will typically comprise several starts and stop positions. A route for a specific vehicle will be set up by a supervisory system having control of all storage bins and their content as well as the positions of the vehicles handling the bins.

When operating and controlling a vehicle following a set route relative to tracks laid out on a frame structure forming a grid, it is vital to keep track of all operating vehicles and their positions at all times. The positions of a vehicle can be acquired in different ways. One way is to track the position of the vehicle relative to the tracks on top of the frame structure. The position can be acquired by means of tracking devices located externally to the vehicle or by devices integrated in the vehicle.

Another method of tracking the position of the vehicle is by the integrated tracking devices to track the number of crossings passed in x- and y-directions relative to the tracks laid out as a grid structure.

By using integrated tracking devices, the vehicle itself will be able to keep track of its position. Integrated tracking devices are however quite complex systems and not necessarily very precise.

Publication WO2018/082972 A1 describes a method and a remotely operated vehicle for tracking the position of the vehicle following a set route relative to tracks laid out on a frame structure forming a grid.

The method comprising receiving information of the number of track crossings to pass between start and stop position in x- and y-directions according to the set route; directing sensors attached to the vehicle at the tracks along the route of the vehicle; detecting and monitoring track crossings passed when moving the vehicle in the x- and y-directions according to the set route, and transmitting a signal to the controller, controlling the drives of the wheels of the vehicle, when the number of track crossings passed is close to the total number of track crossings to pass between the start and stop positions in respective x- and y-directions along the set route. This system uses the sensors for detecting and monitoring track crossing along the tracks in the x- and y-direction.

An object of the present invention is to provide a precise tracking and confirmation of the position of the vehicle while situated on a grid cell.

Another object of the present invention is to provide a vehicle with a pre-alert arrangement informing of the remaining distance until it reaches a set position, during which the vehicle may react.

SUMMARY OF THE INVENTION

The invention is directed to a remotely operated vehicle with an apparatus to provide a pre-alert and tracking of a position of the vehicle following a travelling route relative to tracks laid out on a rail structure in x, y directions on a rail system. The vehicle having first and seconds sets of wheels connected to drives for moving the vehicle in corresponding x, y directions on the rail system.

The remotely operated vehicle, also referred to as the vehicle, may be a container handling vehicle or a delivery vehicle configured for operating on the rail system.

The arrangement comprises at least three sensors:
a first sensor directed to the rails in the x-direction,
a second sensor directed to the rails in the y-direction, and
a third sensor directed to a corner of an intersection between the rails in the x-direction and y-direction,
wherein each of the sensors are directed downwardly towards the rails in x-, y-directions for determining the position of the vehicle relative to the rails.

The position being a set position of the travelling route on tracks laid out on the rail structure in x, y directions on the rail system. The rail is also referred to as the rail structure.

The sensors may be directed downward with an angle such that they may detect tracks and/or rails in any of the x- or y-direction.

The sensors may be directed vertically downward such that they detect rail structures of the rail system.

The first sensor, the second sensor and the third sensor may be arranged in a sensor module.

The sensor module may be mounted into the structure of the vehicle in a corner position at least partly behind the wheels of the vehicle.

Before arrival at the set position, the first sensor or the second sensor may detect a rail structure in the corresponding travelling direction, and pre-alert a remaining distance to the set position.

At a set position, the first and second sensors may detect their respective rails and conforms the vehicle being in the set position. If for instance, any of the first or second sensors does not detect their respective rails, the controller will notice that the vehicle is not precisely in the set position.

Furthermore, in the set position, the third sensor will not detect any obstacle since it is located in the corner at the intersection between the rails in the x-direction and y-direction. If however, the third sensor, in the set position, detects a rail structure, then the controller would know that the vehicle is not precisely in the set position.

The arrangement may comprise two sensor modules; a first sensor module arranged in the corner position of the vehicle, and a second sensor module arranged at a diametrically opposite a corner position of the vehicle such that the corresponding sensors of the first and second sensor module are equally spaced from their corner position.

The first sensor module may be defined as the front sensor in relation to the travelling direction of the vehicle, and the second sensor module may be defined as the back sensor module.

Each of the first and second sensor module may comprise the at least three sensors; the first, the second and the third sensors, each directed/pointed vertically down towards the rails for determining the position of the vehicle. The sensors are arranged to register any obstacle breaking the beam such that a controller may notice every time the vehicle is passing a rail in the x- or y-direction.

The third sensor may be located on respective first and second sensor module, such that the third sensor of the second sensor module, may pre-alert the remaining distance to the set position when moving in x- or y-direction. Thus, when the third sensor of the second sensor module detects the rail structure of the grid cell of the set position, the controller would know that the remaining distance for the vehicle to travel to the set position, corresponds to the width of the rail structure. The output of the sensor may be used in a feedback loop in a controller for providing signals causing additional or less deceleration of the vehicle.

The arrangement may further comprise a fourth sensor configured to pre-alert a remaining distance to the arrival of the vehicle at the position, by detecting any of the rails in the x- or y-direction.

The fourth sensor position may be located such that it detects a rail when the vehicle is moving towards the set position. According to the location of the fourth sensor relative to the vehicle, the sensor may detect and pre-alert a predefined remaining distance to the set position. For instance, if the preferable pre-alert distance is 10 cm prior to arrival of the vehicle in the set position, the fourth sensor is located accordingly relative to the vehicle. The output of the fourth sensor may be used in a feedback loop in a controller for providing signals causing additional or less deceleration of the vehicle.

The fourth sensor may be arranged in the sensor module together with the first, second and third sensors. All sensors may be provided in the sensor module which may be adapted to plug into the structure of the vehicle behind the wheels.

Each of the first and second sensor module may comprise the first, second, third and fourth sensor. The first and second sensor module may be the same module but arranged to be mounted at diametrically opposite corners of the vehicle.

The first and second module may be mounted into the structure of the vehicle and at least partly behind the wheels of the vehicle at diametrically opposite corners of the vehicle, such that the corresponding sensors of the first and second module are equally spaced from the corner position.

The first and sensor module needs to be of a sufficient surface area to support all four sensors, the sensors being spaced as necessary with respect to underside of the vehicle. Any variations in how the modules attach to the vehicles could have knock-on effects for the accuracy of the sensors and the ability of the signals to provide reliable positional data. The module may be mounted onto the underside of the vehicle nested into a right-angled corner of the vehicle base, which will help to ensure that the module is accurately mounted with respect to the vehicle. Moreover, all the sensors being mounted and fixed within the body of the module will mean that the relative position of the sensors can be accurately adhered to, once the mounted position of the module can be ensured.

The sensors may also be able to share some of the signal processing electronics.

Each of the four sensors of the first and second sensor module may be configured to pre-alert a remaining distance to the arrival of the vehicle at the position, by detecting any of the rail structure in the x- or y-direction.

The output of any of the first, second, third or fourth sensors are used in a feedback loop in a controller for providing signals causing additional or less deceleration of the vehicle. The additional or less deceleration may be provided as necessary based on a predetermined or model of the change of speed profile stored in the controller's memory.

For example, the vehicle may have different mass (weight) between loaded and unloaded storage containers, the change in the momentum required may be hard to predict accurately. Therefore, the signals the sensors give during the acceleration phase may provide information whether the vehicle has picked up a heavy or a light storage container. This information may be used in the deceleration phase to guide the vehicle to a more accurate stop.

The sensors may be optical sensors detecting reflection of lights from the rails. Other or additional sensors for detecting the rails and/or tracks for determining the position and pre-alert may also be used, e.g. acoustic sensors. A sensor having a narrow beam may be advantageous for the signal it will need to output in order to provide a stronger peak/trough signal.

The vehicle may further comprise means for receiving instructions with information of the number of rails crossings to pass between start and stop positions in x- and y-directions according to the set route.

Light is reflected from rails when a vehicle is moving along the tracks in x- or y-directions. When the vehicle is passing a rail in any of the x- or y-direction the light will be reflected such that the controller receives information of the rail passing.

The vehicle may further comprise a controller for controlling the drives of the vehicle according to the number of rails in x- and y-direction passed. When this is close to the total number of rails to pass between the start and stop positions in respective x- and y-directions along the set route, the controller may initiate deceleration of the vehicle.

The signal transmitted to the controller can be used for performing precise control of deceleration and acceleration of the vehicle for following a set route along x- and y-directions. The controller may for example control precise deceleration of the vehicle prior to the next rail crossing where it is to change direction.

The following describes an example of how a remotely operated vehicle may be operated.

The tracks laid out on a rail structure in x- and y-direction forming a grid can be addressed similar as the cells in a spreadsheet. If for instance a storage grid comprises 100 columns or cells for storing bins, each cell can be given a unique identity. A grid with 10 cells in the x-direction and 10-cells in the y-direction will make a 2-dimensional track configuration running on top of 100 cells.

When the movements of the vehicle are controlled, a controller will keep track of which cell the robot is to pick up a bin from, and which cell to place a bin in. Based on this, the controller will set up a route the vehicle is to follow.

If for instance, the vehicle is to pick up a bin from cell C2, and place it in cell H8, and cells C8 and H2 are blocked by other vehicles, the following route may be set up by the controller. First leg of the route is from C2 to C5, the next leg is from C5 to H5, and the last leg is from H5 to H8. According to said route, the vehicle must start and stop three times. It will first drive in the y-direction, then the x-direction, and finally in the y-direction. The vehicle will receive the number of rails (and track) crossings to pass between each start and stop position according to said route.

The sensors attached to the vehicle and detecting means comprised in the vehicle may detect the number of rails and track crossings passed in each direction. When the number of passed crossings is close to the total number of rail crossings to pass on each leg, a signal is transmitted to the controller controlling the movements of the vehicle. In this way, the controller will know exactly when deceleration should start, as well as the rate and duration of acceleration.

The invention is also directed to a method for pre-alerting and tracking of a position of a remotely operated vehicle following a travelling route relative to tracks laid out on rails in x, y directions on a rail system (108). The vehicle having first and seconds sets of wheels connected to drives for moving the vehicle in corresponding x-, y-directions on the rail system.

The vehicle comprises an arrangement comprising at least three sensors:
 a first sensor directed to the rails in the x-direction,
 a second sensor directed to the rails in the y-direction, and
 a third sensor directed to a corner of an intersection between the rails in the x-direction and y-direction.

The method comprises the step of:
 moving the vehicle on rails in the x- and y-directions according to the travelling route towards the position;
 receiving output from the sensors when it detects a rail in the x- or y-directions of the rails defining the grid cell of the position;
 using the output in a feedback loop to a controller;
 providing signals to the wheels for additional or less deceleration as necessary based on a predetermined or model of the change of speed profile stored in the controller's memory,
 detecting, controlling and confirming the position of the vehicle based on measured data from a first, second and third sensor The arrangement may comprise a fourth sensor configured to pre-alert a remaining distance to the arrival of the vehicle at the set position, by detecting the rail structure in any of the x- or y-direction.

The first, second, third and fourth sensors may be arranged in a sensor module.

The arrangement comprises two sensor modules; a first sensor module arranged in the corner position of the vehicle, and a second sensor module arranged at a diametrically opposite a corner position of the vehicle such that the corresponding sensors of the first and second sensor module are equally spaced from their corner position.

BRIEF DESCRIPTION OF THE DRAWINGS

Following drawings are appended by way of example only to facilitate the understanding of the invention.

DETAILED DESCRIPTION OF THE INVENTION

Figure 1:
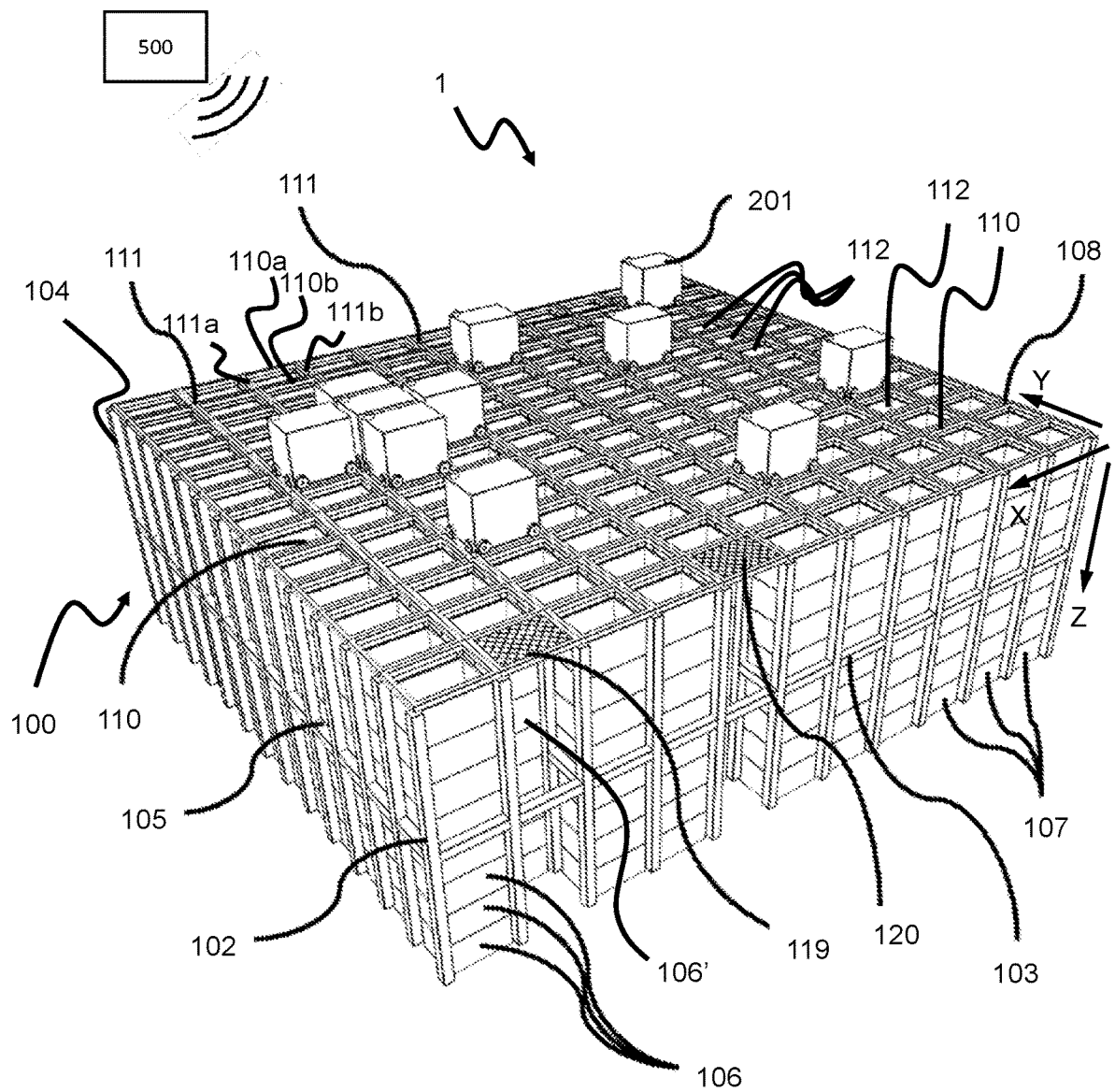
FIG. 1 is a perspective view of a prior art automated storage and retrieval system comprising a plurality of container handling vehicles.
Figure 2:
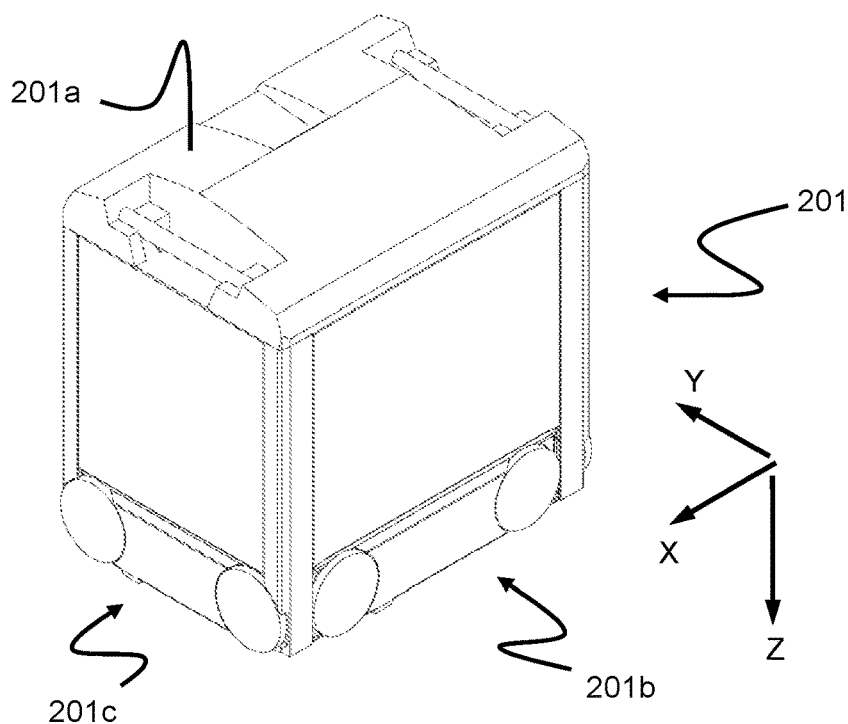
FIGS. 2 and 3 shows examples of system operable prior art container handling vehicles.
Figure 3:
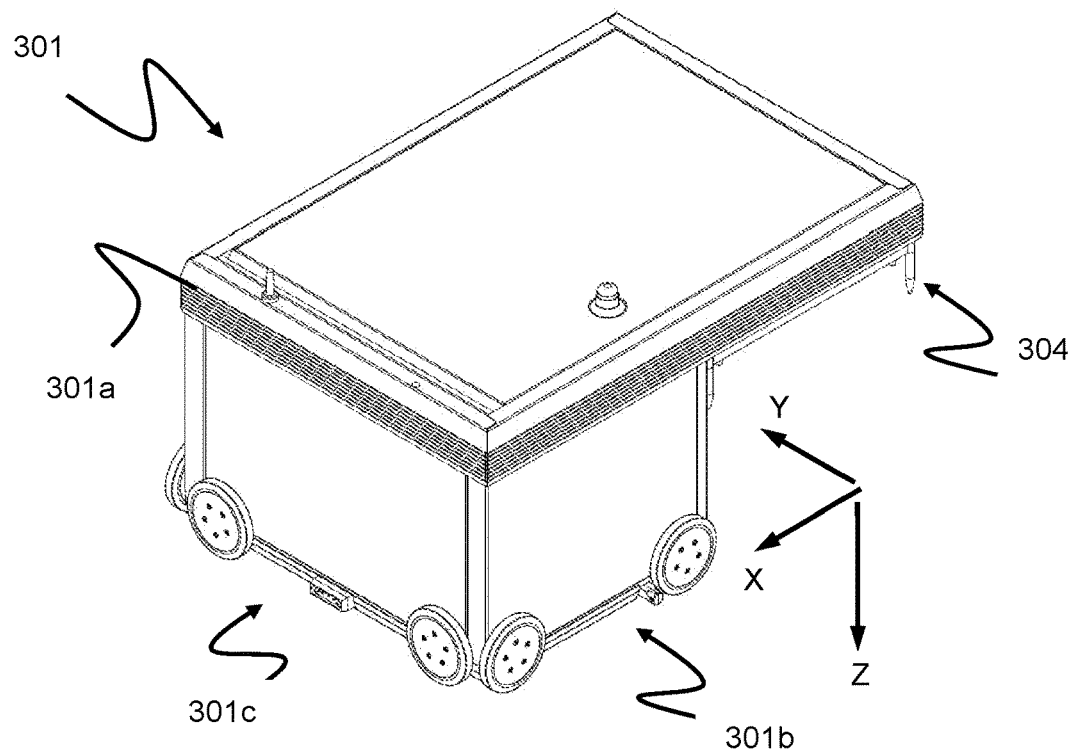

In the following, embodiments of the invention will be discussed in more detail with reference to the appended drawings. It should be understood, however, that the drawings are not intended to limit the invention to the subject-matter depicted in the drawings.

Furthermore, even if some of the features of the present invention are described in relation to a rails system of a storage and retrieval system 1 with a framework structure 100 in combination with container handling vehicles 201, 301 suitable for operating on such system, it is apparent that the features of the present invention are valid for other rail systems (such as delivery rail system) and vehicles (such as delivery vehicles) and vice versa.

With reference to FIG. 1 the storage grid 104 of each storage structure 1 constitutes a framework 100 of in total 143 grid columns 112, where the width and length of the framework corresponds to the width and length of 13 and 11 grid columns 112, respectively. The top layer of the framework 100 is a rail system 108 onto which a plurality of container handling vehicles 200,300 are operated.

The framework 100 of the storage system 1 is constructed in accordance with the above mentioned prior art framework 100 described above, i.e. a plurality of upright members 102 and a plurality of horizontal members 103 which are supported by the upright members 102, and further that the horizontal members 103 includes the rail system 108 of parallel rails 110,111 in the X direction and the Y direction, respectively, arranged across the top of storage columns 105. The horizontal area of a single grid cell 122, i.e. along the X and Y directions, may be defined by the distance between adjacent rails 110 and 111, respectively.

The rail system 108 allows the container handling vehicles 201, 301 to move horizontally between different grid locations, where each grid location is associated with a grid cell 122.

In FIG. 1, the storage grid 104 is shown with a height of eight cells. It is understood, however, that the storage grid 104 can in principle be of any size. In particular it is understood that storage grid 104 can be considerably wider and/or longer than disclosed in FIG. 1.

The storage container vehicles 201,301 may be of any type known in the art, e.g. any one of the automated container handling vehicles disclosed in WO2014/090684 A1, in NO317366 or in WO2015/193278A1.

The rail system 108 may comprise a single track system. Alternatively, the rail system 108 may be a double track system. The rail system 108 may also be a combination of single and double tracks.

Figure 4:
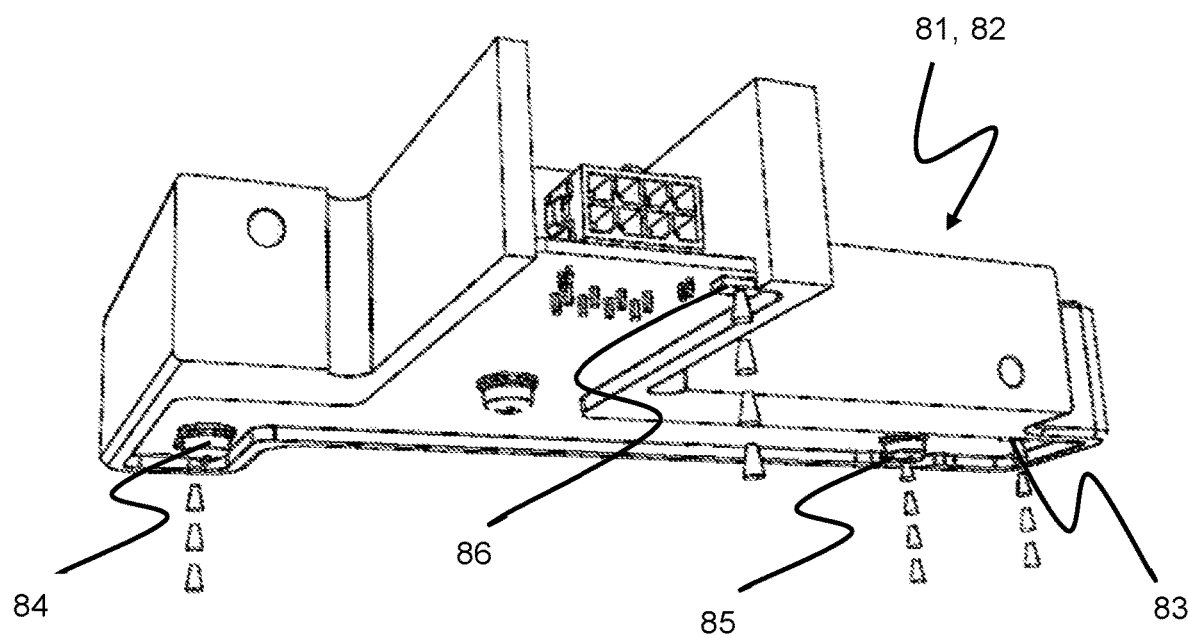
FIG. 4 shows a sensor module comprising a plurality of sensors.

FIG. 4 shows an arrangement of sensors for pre-alert and tracking of a position of to remotely operated vehicle (not shown) following a travelling route relative to tracks laid out on rails in x-, y-directions on a rail system (not shown).

The arrangement comprises a first sensor 83 directed to the rails in the x-direction 110, a second sensor 84 directed to the rails in the y-direction 111, and a third sensor 85 directed to a corner of an intersection between the rails in the x-direction and y-direction 110,111.

The arrangement may also comprise a fourth sensor arranged to pre-alert a remaining distance to the arrival of the vehicle 201,301 at the position, by detecting any of the rails in the x- or y-direction 110,111.

In FIGS. 4, 5, 6, 8, 10 and 11 the beam of the sensors 83,84,85,86 are shown to illustrate the position of the sensors and the direction of their beams. In operation the beams of the vehicle may also be invisible for the human eye.

Each of the sensors 83,84,85 may be directed downwardly towards the rails in x-, y-directions for determining the position of the vehicle relative to the rails 110,111.

The sensors may be arranged on a sensor module as shown in FIG. 4.

Figure 5:
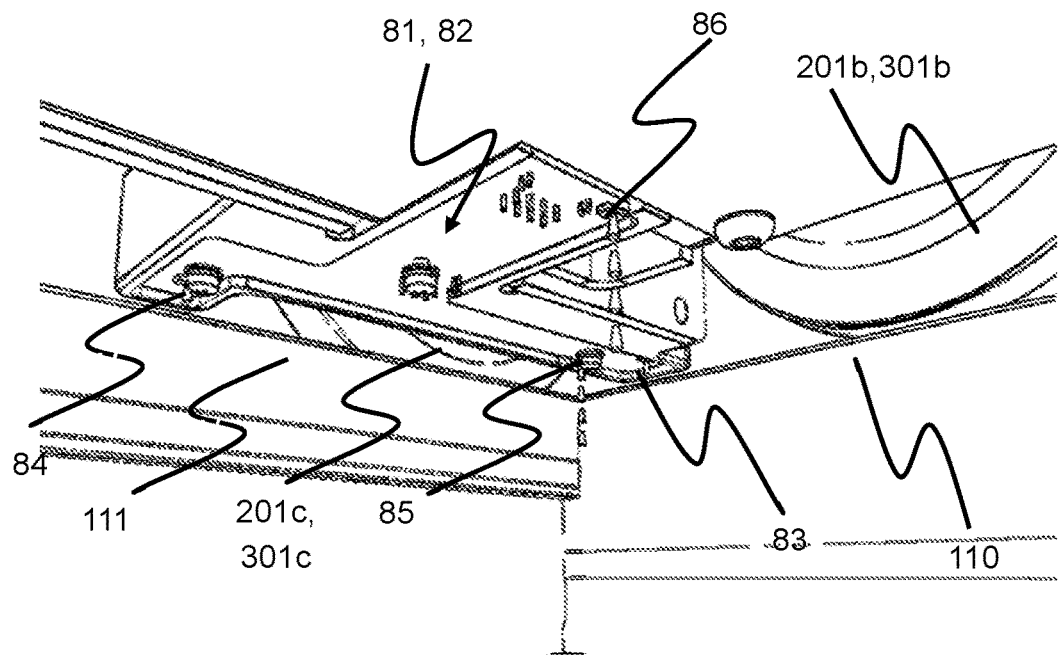
FIG. 5 shows a sensor module mounted in a corner at an underside of a remotely operated vehicle in relation to rails in x and y direction.
Figure 6:
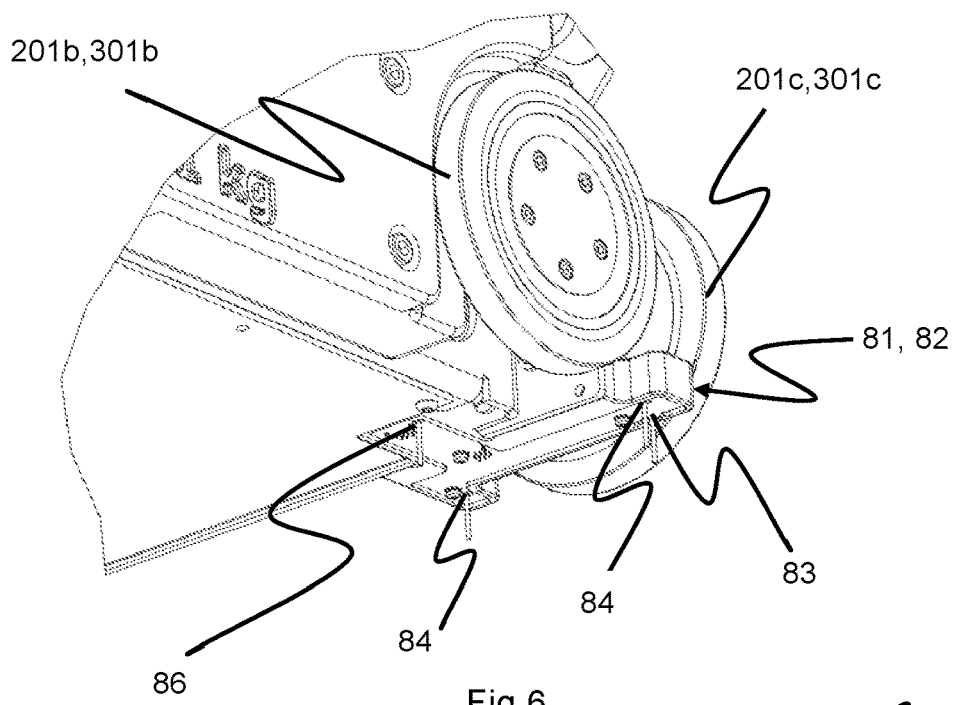
FIG. 6 shows a sensor module mounted in a corner at an underside of a remotely operated vehicle.

The module may be mounted into the structure of the vehicle 201,301 and at least partly behind the wheels of the vehicle as shown in FIG. 5.

The arrangement of the present invention may comprise a first or a second sensor module 81,82. Each sensor module 81,82 comprises one or more sensors 83,84,85,86 directed vertically downwardly towards the rails for determining the position of the vehicle 201,301 relative to the rails (shown in FIG. 11).

The first and second sensor module 81,82 may be one type of senor module with the same pre-arrangement of sensors provided in the sensor module. Each sensor module 81,82 may be adapted to be arranged at a diametrically opposite a corner position of the vehicle, for pre-alerting and tracking of a position of the vehicle following a travelling route relative to tracks laid out on a rail structure in x, y directions 110,111 on a rail system 108. The travelling direction of the vehicle 201,301 may define which is the first and second sensor module 81,82.

The sensor module 81,82 may comprise at least three sensors where a first sensor 83 is directed to the rails in the x-direction 110, a second sensor 84 is directed to the rails in the y-direction 111, the first and second sensors 81,82 are equally spaced from the corner position of the vehicle 201,301 so that they detect any of the rails in the x- and/or y-direction 110,111. A third sensor 85 directed to a corner of an intersection between the rail structure in the x-direction 110 and y-direction 111.

The sensor module 81,82 may further comprise a forth sensor 86 configured to pre-alert a remaining distance to the arrival of the vehicle at the position, by detecting the rail structure in the x- or y-direction 110,111.

FIGS. 4,5,6,8, 10 and 11 shows the sensor module 81,82 comprising the four sensors 83,84,85,86 each located at a predetermined location on the sensor module 81,82 for detecting and reading a position of the vehicle 201,301.

The first and second sensor module 81,82 are mounted into the structure and at least partly behind the wheels 201b,301b,201c,301c of the vehicle 201,301 such that the corresponding sensors 83,84,85,86 of the first and second sensor module 81,82 are equally spaced from the corner position.

Figure 7:
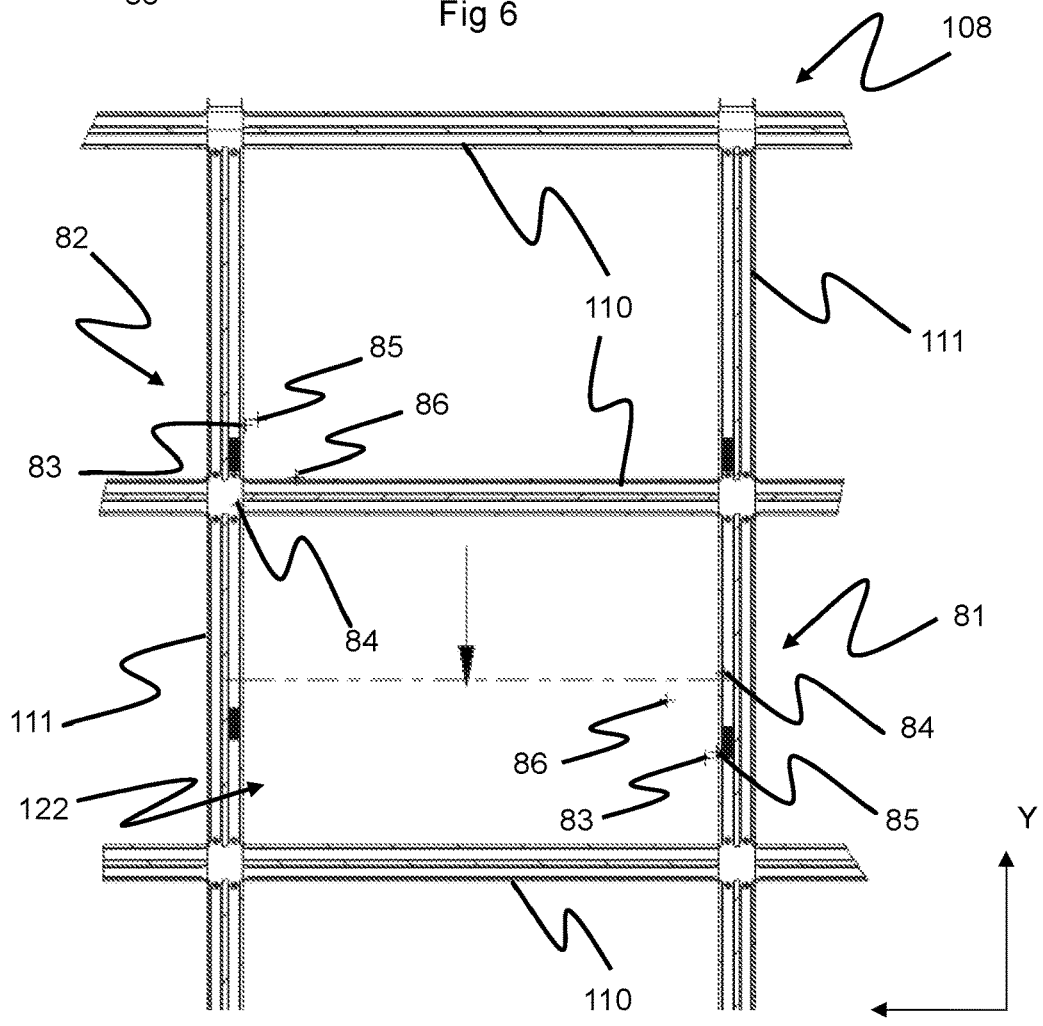
FIG. 7 shows a rail system with rails in x and y direction and with the position of the sensors in relation to the rails when the vehicle moves in the y-direction.
Figure 8:
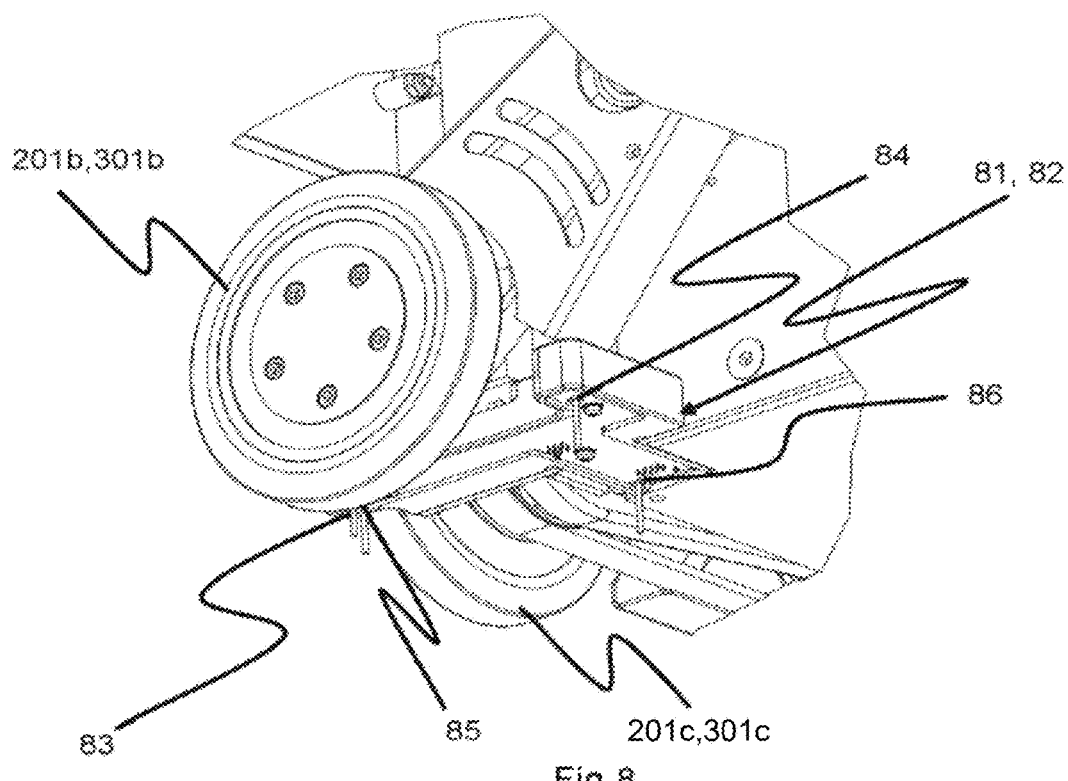
FIG. 8 shows a sensor module mounted in a corner at an underside of a remotely operated vehicle from yet another angle.

FIG. 7 shows a rail system 108 from above and the sensors 83,84,85,86 of a vehicle 201,301 moving in the y-direction on the rail system 108. The vehicle (not shown) comprises a first sensor system 81 located in a front corner in the moving direction of the vehicle 201,301, and a second sensor module 82 located in a diametrically opposite corner position at the back of the moving direction of the vehicle 201,301.

Each sensor module 81,82 comprises four sensors; a first sensor 83 directed to the rail in the x-direction 110, a second sensor 84 directed to the rail in the y-direction 111, a third sensor 85 directed to a corner of an intersection between the rail structure in the x-direction and y-direction 110,111, and a forth sensor 86 located at a predefined location and configured to pre-alert a remaining distance to the arrival of the vehicle 201,301 at the position, by detecting the rail structure in the x or y direction 110,111. The "remaining distance" may vary according to the location of the fourth sensor 86 relative to the vehicle 201,301. The first 83 and second 84 sensors are spaced from the corner position so that they may detect the rail in the x- and y-direction simultaneously while located at the set position, such that the set position can be confirmed with reference to the rails in x- and y-direction 110,111.

While the vehicle 201,301 is moving in the y-direction of the rail system towards a set location on a grid cell 122, the second sensor 84 detects the rails in the y-direction 111 continuously (the sensor is following the rails in y-direction). The fourth sensor 86 of the second sensor module 82 is located at a location relative to the vehicle, such that when the sensor 86 detects the rail structure in the x-direction 110 of the grid cell 122 of the set position, it sends a signal to a controller so as to pre-alert the remaining distance to the set position. Thus, the remaining distance to the set position is defined by the position of the fourth sensor 86 relative to the vehicle 201,301. As shown in FIG. 7, the remaining distance may be set to about 10 cm. If a longer "remaining distance" is preferred, the fourth sensor 86 may be moved closer towards the center of the vehicle, such that the remaining distance can be increased accordingly. The fourth sensor may be integrated into the sensor modules 81,82 or it may be located separate at the underside of the vehicle 201,301.

Furthermore, when the vehicle 201,301 arrives at a set position located on a grid cell 122 of the rail system 108, the first sensor 83 of the first and second sensor 81,82 detects the rail in the x-direction 110, the second sensor 84 of the first and second sensor 81,82 detects the rail in the y-direction 111, the third sensor 85 the first and second sensor 81,82 detects no obstacles since it is located in the corner at the intersection between the rail structure in the x-direction and y-direction 110,111. If the third sensor 85 should detect an obstacle (i.e. a rail structure), then the controller would know that the vehicle 201,301 is located in an offset position (hence, not correctly at the set position on the grid cell). While at the set position on a grid cell 122, the first, second and third sensors 83,84,85 confirms the vehicle being in the set position.

The first and second sensor system 81,82 will work the same way when the vehicle 201,301 is moving in the opposite y-direction on the rail system 108. The first sensor module 81 may be defined as the front sensor module of the vehicle, in the moving direction of the vehicle 201,301. Such that when the vehicle 201,301 moves in opposite direction, the previous second sensor module 82 becomes the first sensor module 81.

Figure 9:
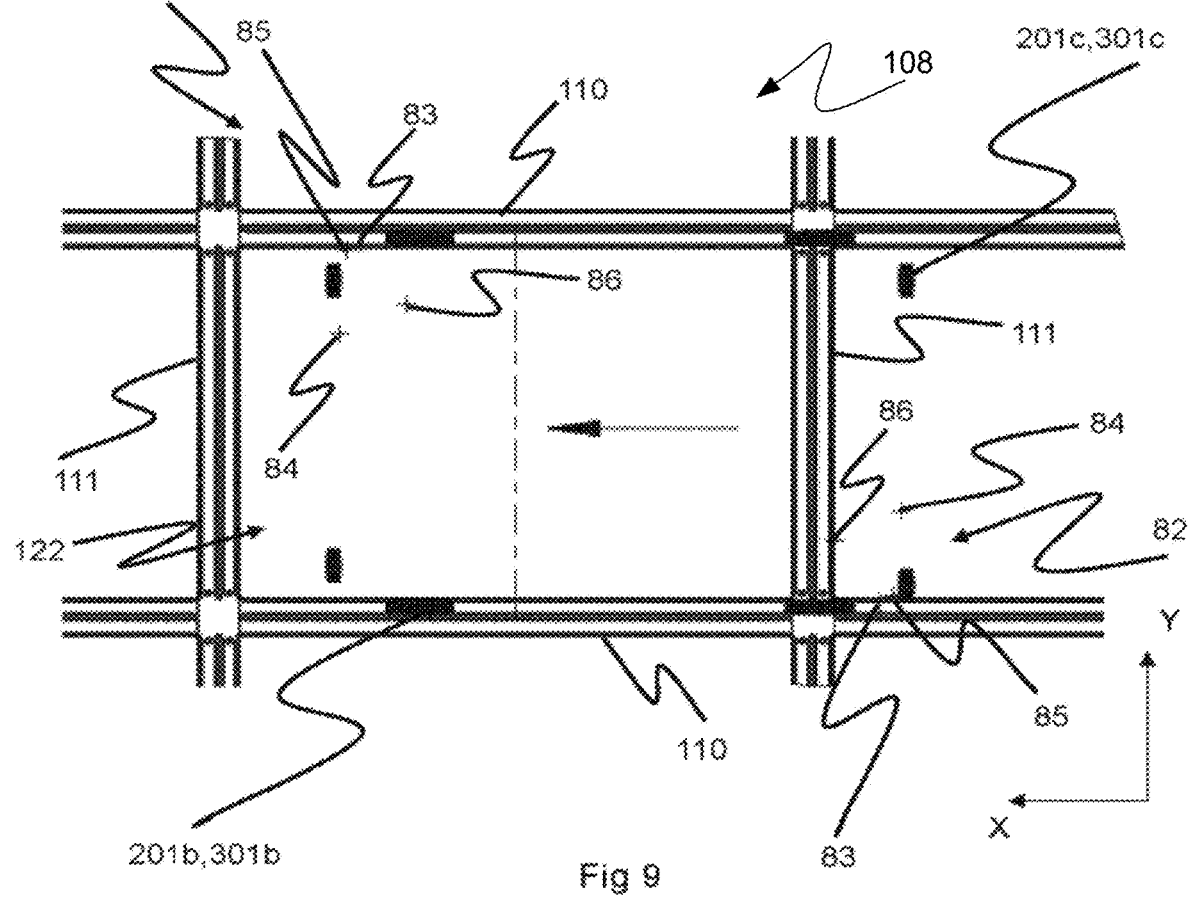
FIG. 9 shows a rail system with rails in x and y direction and with the position of the sensors in relation to the rails when the vehicle moves in the x-direction.

The FIG. 9 shows the sensors 83,84,85,86 of the first and second sensor module 81,82 in a vehicle 201,301 moving in the x-direction of a rail system 108. Accordingly, the first sensor module 83 is located in the front corner of the vehicle 201,301, and the second sensor module 82 is located in a diametrically opposite corner position at the back of the vehicle 201,301 (seen in the moving direction of the vehicle).

Each sensor module 81,82 comprises four sensors; a first sensor 83 directed to the rail in the x-direction 110, a second sensor 84 directed to the rail in the y-direction 111, a third sensor 85 directed to a corner of an intersection between the rail structure in the x-direction and y-direction 110,111, and a forth sensor 86 configured to pre-alert a remaining distance to the arrival of the vehicle at the position, by detecting the rail structure in the x or y direction 110,111. The first 83 and second 84 sensor are spaced from the corner position so that they may detect the rails in respective the x- and y-direction 110,111. Each of the first and second sensor module 81.82 may be equally spaced from the corner position on the vehicle 201,301.

While moving in the x-direction of the rail system 110 towards a set location on a grid cell 122, the first sensor 83 detects the rails in the x-direction 110 continuously as the vehicle 201,301 moves along rails in the x-direction. The fourth sensor 86 of the second sensor module 82 is located such that when the sensor 86 detects the rail structure in the y-direction 111 of the grid cell 122 of the set position, it sends a signal to a controller so as to pre-alert the remaining distance to the set position. Thus, the remaining distance to the set position is defined by the position of the fourth sensor 86 relative to the vehicle 201,301. As shown in FIG. 9, the remaining distance may be set to about 10 cm. Any prepreferable distance may be obtained by moving the location of the fourth sensor 86, relative to the vehicle.

Furthermore, when the vehicle 201,301 arrives at a set position located on a grid cell 122 of the rails system 108, the first sensor 83 of the first and second sensor module 81,82 detects the rails in the x-direction 110, the second sensor 84 of the first and second sensor 81,82 detects the rails in the y-direction 111, the third sensor 85 of the first and second sensor 81,82 detects no obstacles since it is located in the corner at the intersection between the rail structure in the x-direction and y-direction 110,111. If the third sensor 85 should detect an obstacle (i.e. a rail structure), then the controller would know that the vehicle 201,301 is located in an offset position (hence, not correctly at the set position on the grid cell). The first, second and third sensors 83,84,85 detects and confirms the position of the vehicle 201,301.

Accordingly, sensors 83,84,85,86 of the first and second sensor system 81,82 will work the same way when the vehicle 201,301 is moving in the opposite x-direction of the rail system 108. The first sensor module 81 may be defined as the front sensor module in the moving direction of the vehicle 201,301. Such that when the vehicle 201,301 moves in opposite direction, the previous second sensor module 82 becomes the first sensor module 81.

Figure 10:
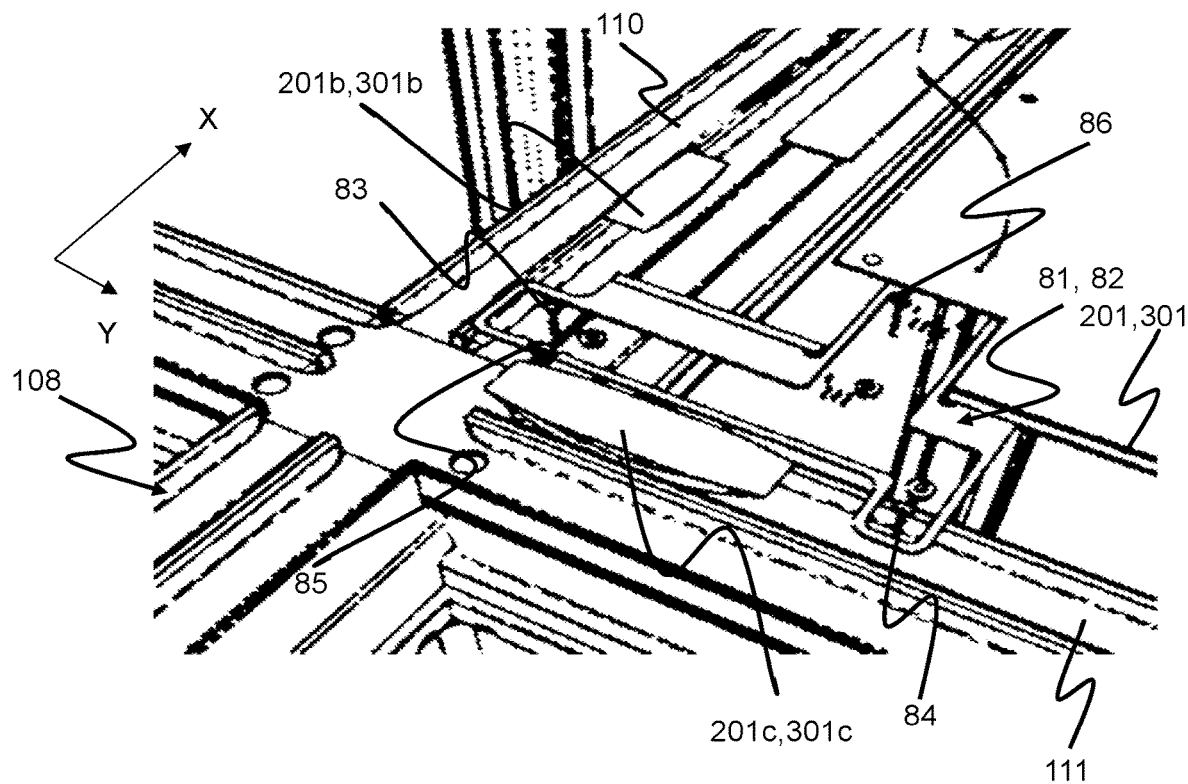
FIG. 10 shows the sensor module and the four sensors in a cross section from above in relation to the rails in x and y direction.

FIG. 10 shows a cross section of the remotely operated vehicle 201,301 taken horizontally through the first or second sensor module 81,82. The sensor module 81,82 comprises a first 83, a second 84, a third 85 and a fourth 86 sensor, each of the sensors are directed vertically downward to detect the rail structures. The vehicle 201,301 is located at the set position such that the first sensor 83 is detecting the rail in the x-direction 110, and the second sensor 84 is detecting the rail in the y-direction 111. The third sensor is situated at the corner of the intersection between the x-rail 110 and y-rail 111 and detects no obstacles.

Figure 11:
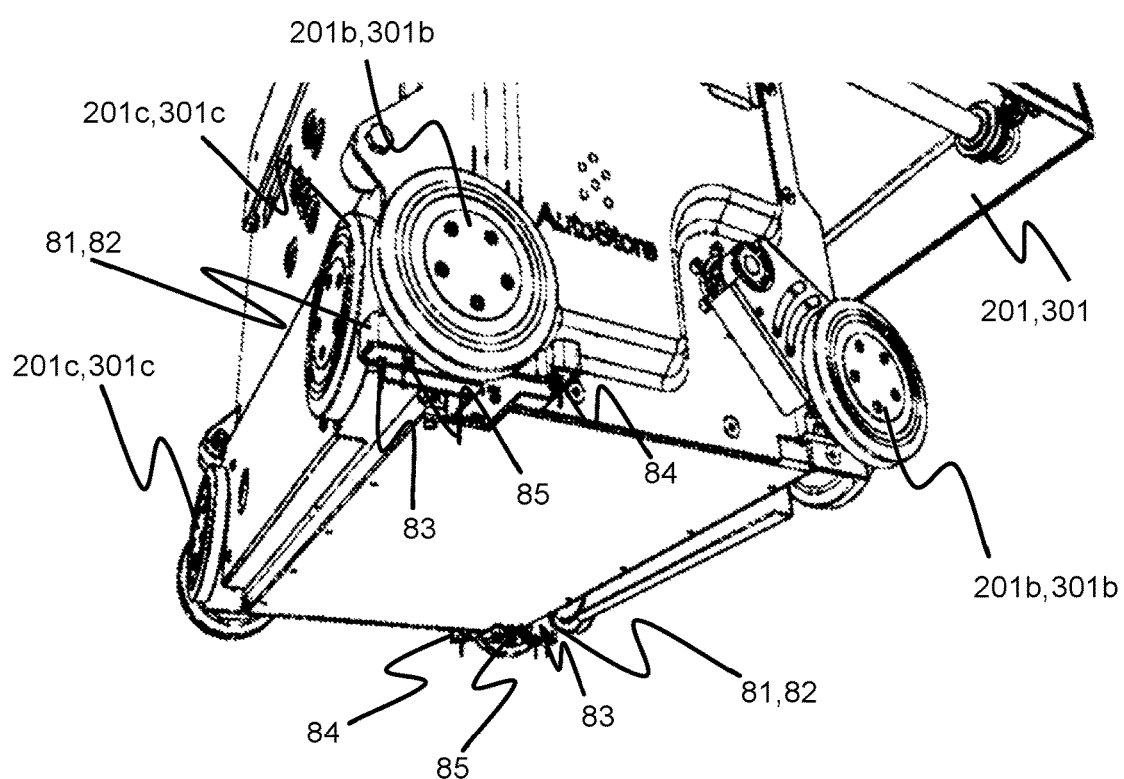
FIG. 11 shows a remotely operated vehicle comprising a first and a second sensor module arranged at a diametrically opposite a corner position of the vehicle.

FIG. 11 shows the first sensor module 81 and the second sensor module 82 dependent of the direction of travel for the vehicle 201,301. The sensor modules 81,82 are arranged at a diametrically opposite a corner position of the vehicle 201,301. Each of the sensor modules 81,82 may be the first sensor module 81, depending on the moving direction of the vehicle 201,301.

REFERENCE NUMERALS

P1 Horizontal plane of delivery rail grid
100 Framework structure
102 Upright members of framework structure
103 Horizontal members of framework structure
104 Storage grid/three-dimensional grid
105 Storage column
106 Storage container
107 Stack
108 Rail system
110 First set of parallel rails in first direction (X)
111 Second set of parallel rails in second direction (Y)
119 Delivery column
120 Delivery column
122 Grid cell
201 First container handling vehicle
201 b,c Wheel arrangement in x-y-directions of first container handling vehicle
301 Second container handling vehicle
301b,c Wheel arrangement in x-y-directions of second container handling vehicle
X First direction
Y Second direction
P Horizontal plane of rail system
81 First sensor module
82 Second sensor module
83 First sensor
84 Second sensor
85 Third sensor
86 Fourth sensor

The invention claimed is:

1. A remotely operated vehicle comprising:
an arrangement to provide a pre-alert and tracking of a position of the vehicle following a travelling route relative to tracks laid out on rails in x-, y-directions on a rail system,
wherein the vehicle has first and seconds sets of wheels connected to drives for moving the vehicle in corresponding x-, y-directions on the rail system,
wherein the arrangement comprises at least one sensor module comprising at least four sensors:
a first sensor directed vertically downwards to detect the rails in the x-direction on the sensor module,
a second sensor directed vertically downwards to detect the rails in the y-direction on the sensor module,
a third sensor directed vertically downwards and positioned on the sensor module to detect a corner of an intersection between the rails in the x-direction and y-direction, and
a fourth sensor configured to detect a remaining distance to the arrival of the vehicle at a set position, by detecting the rails in the x-direction when travelling in the y-direction, and detecting the rail in the y-direction when travelling in the x-direction, the fourth sensor being placed at a predefined position on the sensor module; and
a controller provided on the vehicle to receive output from at least one of the sensors and to pre-alert the remaining distance of the arrival of the vehicle at the position,
wherein, when the vehicle is at the set position, the third sensor does not detect a rail structure.

2. The remotely operated vehicle according to claim 1, wherein the sensor module is mounted into a structure of the vehicle in a corner position at least partly behind at least one of the wheels of the vehicle.

3. The remotely operated vehicle according to claim 1, wherein the arrangement further comprises:
a first sensor module arranged in a corner position of the vehicle, and
a second sensor module arranged at a diametrically opposite corner position of the vehicle such that the corresponding sensors of the first and second sensor module are equally spaced from respective corner positions.

4. The remotely operated vehicle according to claim 1, wherein output of at least one of the sensors is used in a feedback loop in a controller for providing signals causing additional or less deceleration of the vehicle.

5. A method for pre-alerting and tracking of a position of a remotely operated vehicle following a travelling route relative to tracks laid out on rails in x, y directions on a rail system, the vehicle having first and seconds sets of wheels connected to drives for moving the vehicle in corresponding x-, y-directions on the rail system,
wherein the vehicle comprises:
an arrangement of at least one sensor module comprising at least four sensors:
a first sensor directed vertically downwards to detect the rails in the x-direction on the sensor module,
a second sensor directed vertically downwards to detect the rails in the y-direction on the sensor module, and
a third sensor directed vertically downwards and positioned on the sensor module to detect a corner of an intersection between the rails in the x-direction and y-direction, and
a fourth sensor configured to detect a remaining distance to the arrival of the vehicle at a set position, by detecting the rails in the x-direction when travelling in the y-direction, and detecting the rail in the y-direction when travelling in the x-direction, the fourth sensor being placed at a predefined position on the sensor module; and
a controller provided on the vehicle configured for performing the method:

moving the vehicle on rails in the x- and y-directions according to the travelling route towards the position, receiving output from at least one of the sensors when a rail is detected in the x- or y-directions of the rails defining a grid cell of the position, using the output in a feedback loop to a controller, providing signals to the wheels for additional or less deceleration as necessary based on a predetermined or model of a change of speed profile stored in a memory of the controller, and detecting, controlling, and confirming the position of the vehicle based on measured data from the first, second, and third sensor, wherein, when the vehicle is at the set position, the third sensor does not detect a rail structure.

6. The method according to claim 5, wherein the arrangement comprises:

a first sensor module arranged in the corner position of the vehicle, and a second sensor module arranged at a diametrically opposite corner position of the vehicle such that the corresponding sensors of the first and second sensor module are equally spaced from respective corner positions.

\* \* \* \* \*